Dec. 11, 1973    HANS METZGER ET AL    3,778,311
FOIL FOR GAS DIFFUSION ELECTRODES FOR ELECTROCHEMICAL
CELLS AND PROCESS OF MAKING THE SAME
Filed March 9, 1972

United States Patent Office 3,778,311
Patented Dec. 11, 1973

3,778,311
FOIL FOR GAS DIFFUSION ELECTRODES FOR ELECTROCHEMICAL CELLS AND PROCESS OF MAKING THE SAME
Hans Metzger, Tubingen-Lustnau, Klaus Brill, Korntal, and Friedrich Hornung, Stuttgart, Germany, assignors to Robert Bosch GmbH, Stuttgart, Germany
Filed Mar. 9, 1972, Ser. No. 233,238
Claims priority, application Germany, Mar. 31, 1971, P 21 15 618.3
Int. Cl. H01m 13/00
U.S. Cl. 136—120 FC                    5 Claims

ABSTRACT OF THE DISCLOSURE

An air-permeable, electrolyte-impermeable composite foil for self-breathing gas diffusion electrodes for use in electrochemical cells and in particular fuel cells, comprises a rigid sintered carrier foil of a fluorine-containing polymeric compound and, firmly bonded thereto, a non-sintered microporous layer of a fluorine containing polymeric compound. The foil is of light weight, thin and mechanically stable and thus forms an excellent support for a catalyst coating.

BACKGROUND OF THE INVENTION

The invention relates to an air-permeable, electrolyte-impermeable foil for self-breathing gas diffusion electrodes for use in electrochemical cells particularly in fuel cells or metal/air cells and a process of making these foils.

It has already been proposed to form air permeable, electrolyte-impermeable foils for gas diffusion electrodes by spraying of a suspension of polytetrafluoroethylene onto a hot base which is provided with a release agent. Another proposal is to form these electrodes by precipitating the polytetrafluoroethylene powder in an electrical field on temporary or auxiliary electrodes. These processes require to sinter the foils after their application at a temperature of 350–390° C. in order to obtain a sufficient mechanical stability. The products thus formed however do not have a sufficient pressure resistance for a high gas throughput.

In the Austrian Pat. 286,397 an electrode has been disclosed for a fuel cell or metal/air cell which consists of an unsintered continuous polytetrafluoroethylene film and a catalytic material. This type of electrode however does not have the mechanical strength which is necessary for practical use. The electrode must therefore be provided with a porous carbon material or a metal grid support. This however makes the electrodes comparatively thick and heavy which is undesirable where a highly compact light-weight fuel cell or metal/air cell battery is wanted.

It is therefore an object of the present invention to provide a foil for a self-breathing gas diffusion electrode which, on one hand, is of light weight, thin, and mechanically sufficiently strong and, on the other hand, has at least in part a microporous structure which assures a high pressure resistance. In other words a foil is wanted which presents a higher resistance material to the electrolyte cross-section than in case of macroporous foils but which nevertheless does not substantially reduce the oxygen diffusion through the foil.

SUMMARY OF THE INVENTION

The invention accordingly resides in a composite foil for self-breathing gas diffusion electrodes which comprises a rigid sintered carrier foil of a fluorine-containing polymeric compound to which a non-sintered microporous layer which likewise consists of a fluorine-containing polymeric compound is firmly bonded.

The invention furthermore embraces a process of making the foil which for instance may be carried out by casting a dispersion of polytetrafluorine with or without presence of an emulsifying agent upon the carrier foil held in a casting frame and then permitting the polytetrafluoroethylene particles to settle and finally evaporating the dispersing medium and drying the composite foil.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE INVENTION AND OF PREFERRED EMBODIMENTS OF THE PROCESS OF MAKING IT

The invention is based on the finding that it is not the same whether high air-permeability is obtained with comparatively large pores or on the other hand with a large number of micropores. Rather it has been found that microporous foils are more effective since air is drawn into the electrolyte by suction through the micropores by means of specific not completely explored capillary effects. It has furthermore been found that it is apparently without significance whether the entire membrane or only its surface is formed of a microporous material.

The preferred fluorine-containing polymer for use in the invention is polytetrafluoroethylene.

Figure 2:
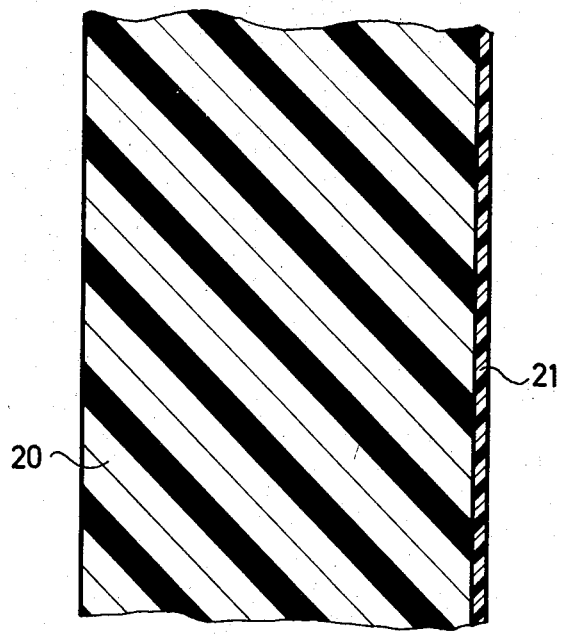
FIG. 2 shows in section and on an enlarged scale the foil of the present invention.

As appears from FIG. 2 of the drawing the foil of the invention comprises a relatively heavy carrier portion 20 and a relatively thin microporous coating 21.

The particle size of the polytetrafluoroethylene particles in the carrier portion preferably is between 30 and 50 microns while the particle size of the microporous coating is between 0.2 and 2.0 microns. The pore size of the carrier foil preferably is between 0.5 and 50 microns while the microporous layer has a pore size between 0.05 and 0.3 micron. The pore volume of the carrier foil is preferably between about 30 and 50% while the pore volume of the microporous layer is between about 15 and 25%.

The thickness of the carrier foil preferably is between about 0.2 and 0.8 mm. and the thickness of the microporous layer is between 20 and 200 microns.

Figure 1:
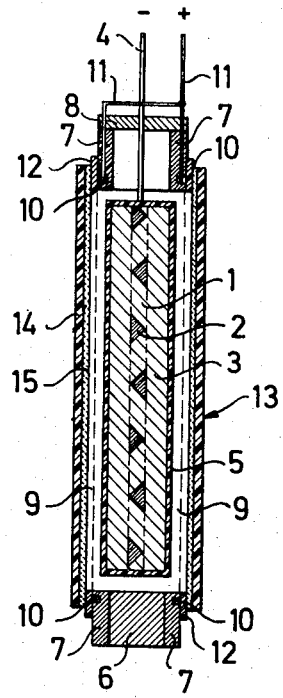
FIG. 1 shows, merely for illustrative purposes, a vertical section through a zinc-air battery in which a gas electrode is used in which a foil according to the present invention is incorporated.

Merely for illustration of a device in which the foil may be used reference is made to FIG. 1 of the drawing.

It will be seen that 1 is a zinc electrode in which metallic zinc 3 is applied to a grid 2 of zinc-coated iron. The electrode is provided with a terminal 4 which at its inside is conductively connected to the metal grid.

The entire electrode is surrounded by a separator 5 made of a thin transparent foil of cellulose ("cell glass") having a thickness of about 0.03 mm. A perforated polyvinylchloride foil may also be used for this purpose. The electrode 1 is disposed in a housing 6 by means of electrode holder 7 of which in the drawing of FIG. 1 only the bottom and top portion are shown and which is provided with a lid 8.

In the two section portions of the electrode holder shown in FIG. 1 there are provided openings 9. Around the edge of each opening there is formed a slot 10 by milling or a similar process for receiving a wire 11 which is coiled around the electrode and which extends upwards through the lid 8 to permit collecting the generated current.

The edges of the two openings 9 are provided with an electrically conductive lacquer 12 which also surrounds the wire disposed in the slot 10. The hydrophobic gas electrode 13 is placed in contact with its conductive phase with that lacquer. Thus, a conductive fluid-tight connection is formed between the electrode 13 and the current terminal 11.

The composite foil of the invention used in the battery is indicated as 14. It is provided with a catalytically active coating 15 which is firmly adhered to the composite foil and contains the electrically conductive pigments.

The following examples will further illustrate the process of making the foil of the invention.

EXAMPLE 1

Making of the carrier foil

A dispersion of a suspension polymerizate of polytetrafluoroethylene (PTFE) of a particle size between 30–50 micron in trifluorotrichloroethane at a ratio of 135 g. PTFE for 1 liter of liquid was cast on a glass plate provided with a roughened surface and held in a casting frame. The dispersion was applied in an amount of 30 cc. for each $dm.^2$ of glass plate. The PTFE was permitted to settle out whereupon the dispersing medium was evaporated. The foil was then dried in air at room temperature. The foil was then compacted by means of a roller of 6 cm. width applying a force of 1 kp. It was subsequently sintered in a nitrogen atmosphere for 20 minutes at a temperature of 380° C.

Application of the microporous layer

In this case a PTFE dispersion was used which was free of emulsifying agent and had a particle size of 0.3–1.0 micron. The dispersion was made from a PTFE emulsion polymerizate by means of a high-speed laboratory stirrer using isobutanol as dispersing agent. 70 gram of PTFE were used for each liter of liquid. The dispersion was cast on one face of the carrier foil in an amount of 15 cc. per $dm.^2$. The PTFE particles were then permitted to settle, the dispersing agent was evaporated and the foil was dried in air at room temperature. Subsequently the settled layer was compacted mechanically by rollers and thus took on its final microporous structure.

EXAMPLE 2

A PTFE dispersion containing an emulsifying agent was applied to a carrier foil formed as disclosed in Example 1 by means of a brush. The coating was then dried in air and the application was repeated twice. The emulsifying agent was eliminated by brief heating of the foil to 300° C. The thickness of the applied coating was about 30 microns.

EXAMPLE 3

Instead of the application by means of a brush the dispersion in this case was applied by dipping the carrier foil so as to obtain a microporous coating on both faces.

The thermal aftertreatment was effected as described in the preceding example.

The composite foils of the invention are air-permeable and electrolyte-impermeable. They are of light weight, thin and rigid and thus form an excellent base for bonding of a catalyst deposit. They do not let the electrolyte penetrate even after long periods of use and in spite of excellent diffusion regarding the air oxygen. They can be made without any substantial expense. Premade sintered carrier foils may also be used in connection with the invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Air-permeable, electrolyte-impermeable composite foil for self-breathing gas diffusion electrodes for use in electrochemical cells comprising a sintered carrier foil of a fluorine-containing polymeric compound and, firmly bonded thereto, a non-sintered microporous layer of fluorine-containing polymeric compound.

2. A foil for a gas diffusion electrode as defined in claim 1 wherein the fluorine-containing polymeric compound is polytetrafluoroethylene.

3. A foil for a gas diffusion electrode as defined in claim 1 wherein the pore size of the carrier foil is between about 0.5 and 50 microns and wherein the pore size of the microporous layer is between about 0.05 and 0.3 micron.

4. A foil for a gas diffusion electrode as defined in claim 1 wherein the pore volume of the carrier foil is between 30 and 50%, and wherein the pore volume of the microporous layer is between 15 and 25%.

5. A foil for a gas diffusion electrode as defined in claim 2 wherein the particle size of the polytetrafluoroethylene particles in the carrier foil is between about 30 and 50 microns and wherein the corresponding particle size of the microporous layer is between about 0.2 and 2.0 microns and wherein the thickness of the carrier foil is between 0.2 and 0.8 mm. and the thickness of the microporous layer is between 20 and 200 microns.

References Cited

UNITED STATES PATENTS

| | | | |
|---|---|---|---|
| 3,385,780 | 5/1968 | Feng | 204—294 |
| 3,432,355 | 3/1969 | Niedrach et al. | 136—120 FC X |
| 3,457,113 | 7/1969 | Deibert | 136—86 |
| 3,527,616 | 9/1970 | Landi | 136—120 FC X |
| 3,553,024 | 1/1971 | Fishman | 136—86 |
| 3,630,784 | 12/1971 | Kuhn | 136—120 FC |
| 3,663,303 | 5/1972 | Dietz | 136—122 |

ANTHONY SKAPARS, Primary Examiner

U.S. Cl. X.R.

136—86 D